Feb. 15, 1927.
S. L. SCHLEPPY ET AL
1,617,421
SPOOL
Filed Dec. 18, 1923
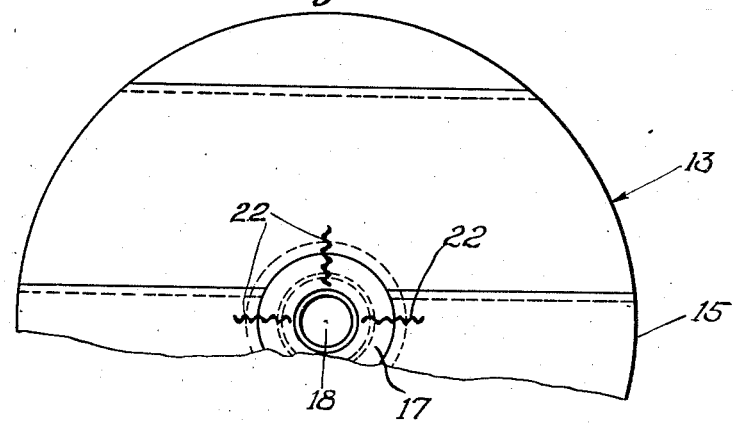
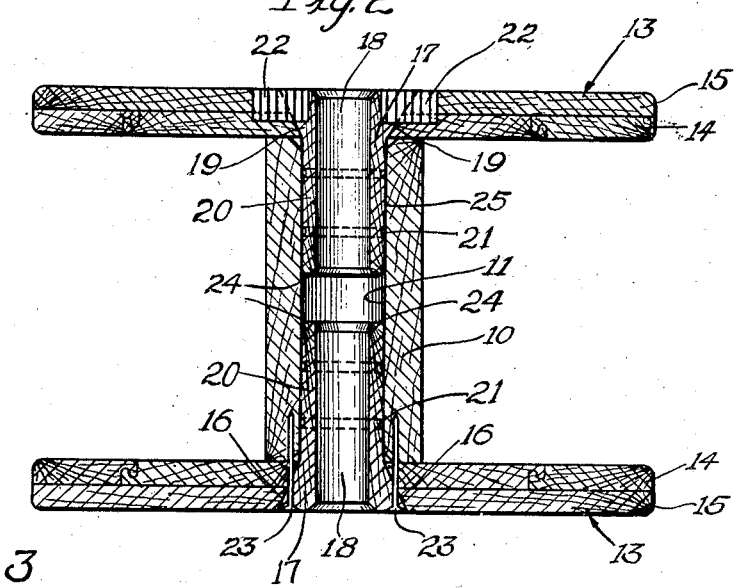
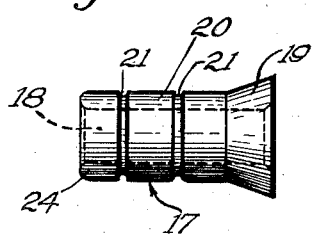
Inventors
S.Leon Schleppy
Arthur A. Bureau
by H.A. Cutuson
Atty.

Patented Feb. 15, 1927.

1,617,421

UNITED STATES PATENT OFFICE.

S. LEON SCHLEPPY, OF HOLLYWOOD, AND ARTHUR ALFRED BUREAU, OF CHICAGO, ILLINOIS, ASSIGNORS TO WESTERN ELECTRIC COMPANY, INCORPORATED, OF NEW YORK, N. Y., A CORPORATION OF NEW YORK.

SPOOL.

Application filed December 18, 1923. Serial No. 681,338.

This invention relates to spools, and more particularly to the means for securing the heads of a wire spool to the drum thereof.

An object of this invention is to provide a spool that is strong, inexpensive, and simple in construction.

Another object of this invention is to provide means whereby the spool heads may be rigidly secured to the drum of the spool in such a manner so as to prevent them from rotating relative to the drum or becoming detached therefrom.

A further object of this invention is to provide a spool which is constructed in such a manner that its constituent parts are not very readily disassembled.

A still further object of this invention is to provide a spool which is simple in construction and assembly.

To these ends a spool made in accordance with this invention comprises a drum, two heads, each bored and countersunk at the center, two thimbles, each having a tapered shoulder which fits within the countersink in the head, and a shank portion which projects through the hole in the head and engages the inner surface of the drum, and a securing member driven through the flared shoulder of each thimble and into the adjacent head.

In the accompanying drawings illustrating this invention,

Fig. 1 is a fragmentary end view of the spool;

Fig. 2 is a horizontal sectional view thereof, and

Fig. 3 is a detail view of one of the thimbles.

Referring to the drawings in detail in which like reference numerals designate similar parts throughout the several views, the reel comprises essentially a drum 10 having a central bore 11, two heads 13 consisting of laminations 14 and 15 held together by glued dove-tail joints or any other suitable securing means, and two thimbles 17. All of these parts may be made of any suitable material, but the drum and heads are preferably of soft wood such as poplar, while the thimbles are made of some hard wood such as maple or hard-gum. Each of the thimbles 17 has a bore 18 through its center, a flared shoulder 19, and a shank portion 20, said shank portion having a series of annular grooves 21 designed to retain adhesive material in a manner hereinafter to be described. The bore 11 of the drum 10 is slighty countersunk at each end and the end of each thimble shank is slighty beveled at 24 to facilitate the insertion of the shank of the thimble within the bore of the drum.

In assembling the spool, the heads 13 are mounted on the thimbles 17 in such manner that the flared shoulders 19 of the latter engage with the countersink 16 in the heads 13. The flared shoulder 19 is of the same thickness as the head 13, whereby the outer end of the shoulder is positioned flush with the outer surface of the head 13. The shanks 20 of the thimbles 17 are covered with a coating of glue or other adhesive material 25 and are then inserted within opposite ends of the bore 11, the annular grooves 21 in the thimble shanks serving to retain the glue that would be otherwise scraped from the surface of the shank 20 during its insertion within the bore of the drum. The countersunk ends of the bore 11 serve to retain any excess glue 25 which is not accumulated within the grooves 21 of the thimble. The glue 25 serves to secure the thimbles within the bore of the drum, and additional means is provided to prevent the heads from loosening or rotating on the thimbles. This means comprises a cleat 22 which is driven into the end of the thimble 17 and associated head 13, as shown in Figs. 1 and 2. The cleat 22 serves to secure the thimble and its associated head together and prevent the head from becoming loosened or rotating on the thimble.

In place of the cleats 22 nails 23 may be used, which are driven through the flared shoulder 19 of each thimble 17 into the adjacent end of the drum 10. The nails prevent the heads 13 from loosening or rotating on the thimbles 17, and in addition augment the action of the glue 25 to prevent the thimbles 17 from rotating within the drum 10 or becoming dislodged therefrom.

What is claimed is:

1. A spool for receiving wire and the like, comprising a drum having a longitudinal bore of uniform cross-section, two thimbles, each having an elongated shank fitted within the bore with the inner ends thereof approximating each other, each of said thimbles being formed with a flared shoulder and a plurality of annular disconnected grooves to receive an adhesive to retain it in position with the drum, two heads relatively large in diameter with respect to the diameter of the drum, each head being mounted upon the flared shoulder of one of the thimbles and held against one end of the drum by the engagement therewith of the entire peripheral surface of the companion thimble shoulder, the thickness of each head being equal to the length of the flared shoulder of its associated thimble, and a securing member driven into the drum through the flared shoulder of each thimble and companion head so as to substantially bisect the engaging surface of said head and thimble.

2. A spool for receiving wire and the like, comprising a drum having a longitudinal bore of uniform cross-section, two thimbles each having an elongated shank fitted within the bore with the inner ends thereof approximating each other, each of said thimbles being formed with a flared shoulder and a plurality of continuous disconnected annular grooves to receive an adhesive to retain it in position with the drum, two heads relatively large in diameter with respect to the diameter of the drum, each head being mounted upon the flared shoulder of one of the thimbles and held against one end of the drum by the engagement therewith of the entire peripheral surface of the companion thimble shoulder, the thickness of each head being equal to the length of the flared shoulder of its associated thimble and the outer face of each head being coplanar with the end surface of its respective thimble, and a securing member driven into the drum through the flared shoulder of each thimble and companion head so as to substantially bisect the engaging surface of said head and thimble.

In witness whereof, we hereunto subscribe our names this 7th day of December A. D., 1923.

S. LEON SCHLEPPY.
ARTHUR ALFRED BUREAU.